United States Patent
Andros

(10) Patent No.: US 6,699,920 B1
(45) Date of Patent: Mar. 2, 2004

(54) METHODS OF MANUFACTURING POLISHING SUBSTRATES

(76) Inventor: Nicholas Andros, 913 W. Glenrosa Ave., Phoenix, AZ (US) 95013

( * ) Notice: Subject to any disclaimer, the term of this patent is extended or adjusted under 35 U.S.C. 154(b) by 166 days.

(21) Appl. No.: 10/075,475

(22) Filed: Feb. 13, 2002

(51) Int. Cl.⁷ .................................. C08L 29/04
(52) U.S. Cl. ..................... 523/1; 524/612; 524/803; 51/298; 51/297; 433/166; 451/533; 451/540
(58) Field of Search ............................. 523/1; 524/612, 524/803; 51/297, 298; 433/166; 451/533, 540

(56) References Cited

U.S. PATENT DOCUMENTS 5,273,558 A * 12/1993 Nelson et al. ............... 51/298
5,311,634 A    5/1994 Andros
5,518,794 A *  5/1996 Barber et al.
6,022,268 A    2/2000 Roberts et al.

* cited by examiner

*Primary Examiner*—Kriellion Sanders
(74) *Attorney, Agent, or Firm*—Parson&Goltry; Robert A. Parsons; Michael W. Goltry

(57) ABSTRACT

A method of manufacturing a polishing substrate is disclosed. The method includes disposing into a mold a reaction mixture of dibasic acid and a hydroxylated polymer, and applying a pressure and a temperature to the reaction mixture that are sufficient to cause polymerization and substrate formation in the mold. The dibasic acid is preferably adipic acid. Before pressure and temperature are applied to the reaction mixture, the reaction mixture is capable of being fortified with a polishing agent and/or a filler for controlling modulus and/or the coefficient of expansion.

20 Claims, No Drawings

METHODS OF MANUFACTURING POLISHING SUBSTRATES

FIELD OF THE INVENTION

This invention relates to reaction molding and to polishing pads for use in manufacturing semiconductor devices such as wafers or memory disc substrates.

BACKGROUND OF THE INVENTION

Many industries require the ability to efficiently polish highly finished surfaces used in the semiconductor and disc industry. Specific articles having highly finished surfaces include, but are not limited to, semiconductor/silicon wafers and memory disc substrates. Presently, the method of polishing silicon wafers utilizes polishing pads made from felts saturated with urethanes, which have been polymerized to form a rigid surface. Although these devices are highly useful and efficient in polishing highly finished surfaces, they are difficult to manufacture and it is difficult to control their quality during the manufacturing process. The variations that exist from pad to pad are systemic to the saturation process and it is very difficult to produce large numbers of polishing pads with predictable quality and performance characteristics.

Thus, there is a need for new and improved methods of manufacturing polishing pads that are inexpensive, highly efficient, and that produce durable compositions having extremely predictable quality and performance characteristics.

SUMMARY OF THE INVENTION

The above problems and others are at least partially solved and the above purposes and others realized in reaction molding processes for manufacturing polishing pad substrates. A reaction molding process of the invention includes disposing a reaction mixture into a reaction mold and then applying pressure and temperature to the reaction mixture sufficient to cause polymerization and substrate formation. In accordance with the principle of the invention, the reaction mixture consists of polyvinyl alcohol and a dibasic acid with a suitable catalytic cross-linking agent. In another embodiment, the reaction mixture consists of polyvinyl alcohol and an amine with a suitable catalytic cross-linking agent. In yet another embodiment, the reaction mixture consists of mixtures of both dibasic acids and amines with polyvinyl alcohol and a suitable catalytic cross-linking agent. The reaction pressure preferably falls within a range of 10,000–20,000 pounds per square inch (PSI) and the reaction temperature preferably falls within a range of 100–200° C. A polishing pad substrate formed by the reaction molding process of the invention is mildly hard with a typical durometer reading between 90 and 55 Shore D scale and exhibits a mildly waxy surface and, in accordance with the invention, is useful for polishing highly finished surfaces. Prior to the reaction, the reaction mixture is capable of being fortified with one or more polishing agents, one or more fillers for controlling modulus and/or coefficient of expansion of the reaction process, and/or a selected quantity of one or more hydroxylated polymers and/or one or more catalytic cross-linking agents. The reagents of the reaction mixture can be layered in order to produce useful zones of reaction, depending upon the polishing performance characteristics desired of the substrate.

DETAILED DESCRIPTION OF A PREFERRED EMBODIMENT

Reacting a dibasic acid, such as adipic acid, with an alcohol or other hydroxylated polymer under a pressure in a range of 10,000–20,000 pounds per square inch (PSI) and a temperature in a range of 100–200° C., in the presence of a suitable catalyst, produces a polymer having the following structure:

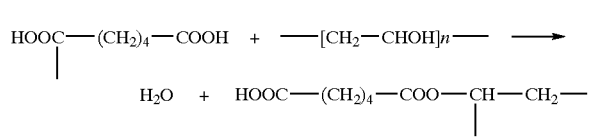

Prosecuting the foregoing reaction with the additional reactant polyvinyl alcohol (PVA), produces a polymer, which exhibits a mildly hard and waxy surface which is useful as a polishing pad for producing highly finished surfaces. The characteristics of the polymer are capable of being altered by the addition of one or more polishing agents such as aluminum oxide, silica, cerium oxide or combinations of several agents, to produce characteristics required to polish substrates to a highly finished surface. These polishing agents can be classified as polyesters.

Reacting a polybasic acid with urea in the presence of a hydroxylated polymer such as PVA produces a mixture of polymers consisting of polyester/polyamides having structures as described above, in addition to the formation of urethanized polymers having the following structure:

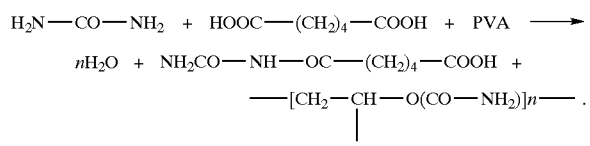

Depending on the particular dibasic acid being used, the amine, and hydroxylated polymer, the resulting hardness of the polishing pad substrate is capable of being varied in order to meet specific polishing needs. Other such dibasic acids are, for example, azelaic acid, malonic acid, succinic acid and certain lactones. Primary and secondary amines can also be used to change the polishing characteristics when urethanization takes place upon the hydroxylated polymer, for example with PVA.

In accordance with the invention, a quantity of dibasic acid, a quantity of PVA and a quantity of urea are mixed together with a suitable catalyst to form a reaction mixture, which is disposed into a reaction mold. To the reaction mixture are added various polishing agents, if desired. The mold is closed and the reaction mixture subjected to high pressure and temperature causing polymerization to take place. These physical conditions cause polymerization to take place forming a polishing substrate. The various components of the reaction mixture can be laid down in layers in the mold, in accordance with an embodiment of the invention. An example of this is disposing a mounting layer of PVA and a cross-linking catalyst on the bottom of the mold and mounting on the mounting layer a polishing layer consisting of the remaining reactants of the reaction mixture including the polishing agents and catalyst in addition to, if desired, a plasticizer, polyethylene glycol, ethylene glycol, etc., in addition to other various polishing agents such as cerium oxide, feldspar, silica, etc. A surfactant can also be used in the polishing layer for facilitating distribution of the polishing layer as it is cross-linked during the molding process. At this point, the mold is closed and the layered substrate subjected to high pressure and temperature. These physical conditions cause polymerization to take place in all the layers with specific polymers grown in zones. This growth zone polymerization forms the basic polishing pad substrate. The zones are chemically attached to one another producing inseparable zones, each having unique chemical and physical characteristics. In a typical example, the polishing layer can consist of 2–5% by weight of a plasticizer, 25–60% by weight of a polishing agent, 1–2% by weight of a surfactant, 35–55% by weight of PVA, and 9–10% by weight of a cross-linking agent. The mounting layer can consist of 90% by weight of PVA and 10% by weight of the cross linking agent.

Just as the shape of the mold defines the form of the product being molded during conventional molding, various geometric inscriptions incorporated into the mold produce various geometric surfaces upon the surface of the pad substrate, enhancing the ability of the substrate to polish highly finished surfaces. A pattern placed onto the surface of various polishing pads imparts specific polishing characteristics when polishing silicon wafer substrates.

Each of the reaction mixtures of the invention is capable of being fortified with additives prior to reaction molding for affecting the physical characteristics of the resulting substrate. For instance, selected quantities cutting and polishing agents such as aluminum oxide, cerium oxide, carborundum, silicon dioxide and the like can be added, either individually or in selected combinations, for producing substrates having desired polishing characteristics. In order to increase modulus and/or reduce the coefficient of expansion, selected quantities of one or more other fillers can be incorporated into the reaction mixture such as microfibers, mineral fillers, etc. Other suitable fillers include, but are not limited to, various inorganic compounds such as silicon carbides, boron derivatives, dry-type slurry materials, etc.

In addition to the unique manner in which the pad substrate of the invention is chemically made, micro-asperities, which are basically controllable, can be introduced into the reaction mixture to produce selected surfaces, which are generally advantageous in polishing. Preferably, the micro-asperities are in the form of micro particles, which have the ability to transport or adsorb charged particles during the polishing processes. This is accomplished by adding to the reaction mixture a hydroxylated polymer of PVA, which has been chemically and molecularly altered to produce cationic, anionic, amphoteric or neutral charges thereby affecting a charge upon the surface of the medium to be polished. A plurality of hydroxylated polymers can be added as well depending on the charge that is desired to be affected on the surface of the medium to be polished. This process of utilizing a charged ion complex of PVA is taught in U.S. Letters Patent No. 6,033,486, which is incorporated by reference herein.

Ultimately, the final physical properties of the resulting substrate formed by the reaction of the reactants in the mold depend largely on the reaction temperature, the reaction pressure, and the duration of the reaction. The reaction temperature can be varied or controlled in order to affect the final physical properties as can the reaction temperature and the reaction duration and any combination of the foregoing can be altered, controlled or varied as desired in any particular reaction event in order to affect the final physical properties of the resulting substrate including, but not limited to, hardness, hydrophilicity or hydrophobic surface qualities, etc., and this will depend on specific user needs. The molded substrate, which is a polishing pad substrate, is, in accordance with the principle of the invention, created by a chemical reaction in a reaction mold, which eliminates the many steps normally involved in producing conventional polishing pads.

As previously mentioned, the shape of the mold in which the reaction takes place, as with conventional reaction molding techniques, governs the shape and form of the resulting substrate of the invention. The shape and form of the resulting substrate can be cylindrical, disc-shaped, or any other desired shape in addition to any desired size, thickness, flatness, etc. It is important to note that polishing pads are often required to have certain surface characteristics in order to facilitate specific polishing operations and to improve polishing performance. Because the substrate of the invention is formed in a reaction mold, the mold can be furnished with various surface geometries for impartation to the resulting molded substrate. The mold can embody a pattern and thus be a patterned mold. By using a patterned mold, a pattern can be imparted to the molded substrate in the course of the reaction of the reaction mixture, which eliminates the necessity of subsequently abrading the surface of the resulting substrate in order to affect a particular pattern to the surface of the substrate. As those of ordinary skill will readily appreciate, patterned surfacing is often important for polishing pads for channeling polishing slurries during polishing and cleaning processes. Often, a polishing pad having an extremely flat surface is required. In this vein, the substrate of the invention can be chemically molded in an electropolished reaction mold for the purpose of imparting very flat or polished surfacing to the resulting molded substrate.

The reaction between adipic acid and urea is a condensation reaction that produces water. To determine the amount of water produced in the reaction, a substrate that is molded in accordance with the teachings of the invention is removed from the reaction mold, as well as all of the flash and cake that extruded out of the mold during the reaction molding process. The flash and cake are carefully weighed (constant weight), and subtracted from the previously weighed mass of the charge (i.e., the reactants) that was placed into the mold before raising the temperature and pressure. The loss of weight represents the weight of water produced by the reaction. Tables I and II, below, shows these weight losses.

TABLE I

Reconciliation of the molding experiments for the production of polishing stones and polishing pads.

| Date Molded | Reaction Type | Theoretical moles $H_2O$ produced | Actual moles $H2O$ produced | Reagents | Remarks | |
|---|---|---|---|---|---|---|
| 4/20/2001 | Esterification | 1.013 | .8127 | Adipic acid w/205S | W/20% $CeO2$ | 3 |
| 4/26/2001 | Esterification | .417 | .063 | Adipic acid w/540S | W/15% $CeO_2$ | 3 |
| 4/30/2001 | Esterification | .97 | .98 | Adipic acid w/540S | W/0% $CeO_2$ | |
| 5/2/2001 | Esterification | .418 | .128 | Adipic acid w/540S | W/15% $Al_2O_3$ | 3 |
| 5/3/2001 | Esterification | .539 | .127 | Azelaic acid w/540S | W/20% $Al_2O_3$ | 3 |
| 5/4/2001 | Esterification | .458 | .530 | Azelaic acid w/540S | 0% filler rubber like | 1 |

TABLE I-continued

Reconciliation of the molding experiments for the production of polishing stones and polishing pads.

| Date Molded | Reaction Type | Theoretical moles $H_2O$ produced | Actual moles H2O produced | Reagents | Remarks | |
|---|---|---|---|---|---|---|
| 5/9/2001 | Esterification | .891 | .653 | Azelaic acid w/540S | W/16% $Al_2O_3$ | 3 |
| 5/10/2001 | Esterification | .402 | .400 | Adipic acid w/540S + urea | 0% filler | 2 |
| 5/10/2001 | Urethanization | .453 | .400 | Adipic acid w/540S + urea | | |
| 5/19/2001 | Urethanization | .341 | .282 | Adipic acid w/540S + urea | 0% filler | |
| 5/19/2001 | Esterification | .301 | .282 | Adipic Acid w/540S + Urea | 0% filler | |
| 5/25/2001 | Urethanization | .216 | .190 AB | Adipic Acid w/540S + Urea | 0% filler | |
| 5/25/2001 | Esterification | .216 | .190 AB | Adipic Acid w/540S + Urea | 0% filler | |

Notes:
1-when hot, bounces like rubber.
2-urethanization probably did not occur, competing reaction was esterification.
3-filler absorbed water.
4-note A-type 4.0 -B reaction; note B-Mold "O" ringed water absorbed in cake.

TABLE II

Cake mass reconciliation

| Date Mold. | Mother mass date | (A) Mold chg. gm. | (B) Flash recovered gm. | (C) Cake mass gm. | A–B–C Net loss gm. | Normalized to moles $H_2O$ |
|---|---|---|---|---|---|---|
| 4/16/2001 | 4/5/2001 | 59.95 | N/R | 41.590 | N/R | |
| 4/18/2001 | 4/17/2001 | 60.00 | N/R | 34.9468 | N/R | |
| 4/19/2001 | 4/17/2001 | 71.04 | N/R | 44.4568 | N/R | |
| 4/20/2001 | 4/17/2001 | 72.02 | 19.906 | 37.6288 | 14.4852 | .8127 |
| 4/23/2001 | 4/17/2001 | 72.12 | 14.07 | 41.3915 | 16.6585 | .93 |
| 4/26/2001 | 4/26/2001 | 68.926 | 4.974 | 62.7352 | 1.2168 | .063 |
| 4/30/2002 | 4/26/2001 | 70.079 | 4.090 | 48.3452 | 17.6438 | .980 |
| 5/2/2001 | 4/26/2001 | 69.054 | 23.762 | 42.5881 | 2.841 | .128 |
| 5/3/2001 | 5/3/2001 | 80.0078 | 26.680 | 50.8078 | 2.520 | .127 |
| 5/4/2001 | 5/3/2001 | 72.246 | 8.175 | 54.4453 | 9.618 | .530 |
| 5/7/2001 | 5/3/2001 | 82.635 | N/R | N/R | | |
| 5/9/2001 | 5/8/2001 | 70.965 | 18.7294 | 40.4270 | 11.8086 | .653 |
| 5/10/2001 | 5/9/2001 | 70.019 | 31.5638 | 30.6589 | 7.7963 | .400 |
| 5/19/2001 | 5/9/2001 | 34.9758 | 24.274 | 24.274 | 5.0694 | .282 |
| 5/25/2001 | 5/9/2001 | 25.0019 | 21.3591 | 21.3591 | 3.4159 | .190 |

Partially urethanized PVA is produced when urea is reacted with PVA in a solvent of dimethylformamide (DMF), examples of which are depicted below, namely, Example 1 and Example 2.

EXAMPLE 1

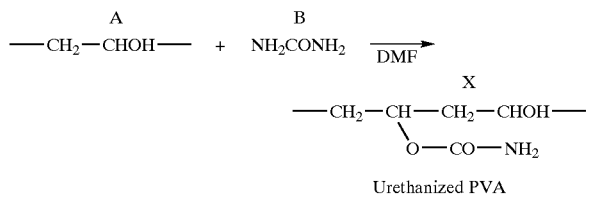

Urethanized PVA

EXAMPLE 2

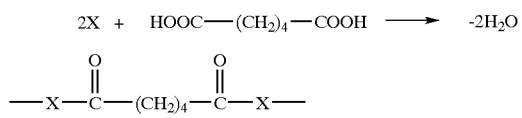

. . . (Adipic Acid)-(X)-(Adipic Acid)-(X) . . . (Adipic Acid)-X- . . .

A study of the amino derivatives in examples 1 and 2 shows that a number of compounds are capable of being produced that have extremely tough properties. However, the problem with the derivatives is the fact that the amine groups as well as the free hydroxyl groups on the PVA molecule make the final product hydrophilic. To overcome this problem, dibasic acid, whether adipic acid or other dibasic acids, are used to insolubilize the urethanized PVA.

It may not be necessary to react the materials in Examples 1 and 2 at atmospheric temperature and pressure, but rather at higher temperatures and pressures. The advantage of such a scheme is that the use of DMF as a solvent can be eliminated, since the latter is highly toxic. Eliminating DMF makes the process environmentally benign.

To test this theory, a mold was machined from stainless steel, with a close fitting male closure. The closure had machined into the side-walls two grooves for the purpose of adding two "O" rings which would make the mold air tight. The tests were conducted with and without "O" rings. The purpose of eliminating the "O" rings was to allow flash and steam to escape from the mold at higher temperatures and pressures. The escapement of water as steam permitted the analysis of the weight loss of the reactants as a function of water produced by the reaction. As water was lost, the pressure dropped, which necessitated a constant monitoring of the press for the purpose of retaining a constant pressure. This was accomplished by continuously adjusting the ram pressure of the press to the reactants pressure within the mold. In this fashion, the mold pressure was held reasonably constant.

When the "O" rings were placed on the mold closure, the water produced by the reaction was retained in the final product. This is clearly seen in the Examples of Apr. 25, 2001 of Table I.

A second consideration is the impact of fillers upon the reaction of the invention. This too is clearly seen in Table I where inert fillers absorb the water produced, illustrating a large discrepancy between the theoretical amount of water calculated and that which was actually detected.

When binary mixtures are reacted such as adipic acid and PVA, the results are quite instructive. The reactions become more complex when a tertiary reaction takes place between three components. Binary reactions as described above always result in esterification of PVA. The preferred procedure is to urethanize the PVA with urea first, then transfer the resulting derivative and mix with the tertiary component, as in this case being a dibasic acid such as adipic or azelaic acid.

When all three components are reacted together a series of derivatives are produced, which are illustrated below as Examples 1–6.

EXAMPLE 1

Cyclic Amides from Adipic Acid and Urea

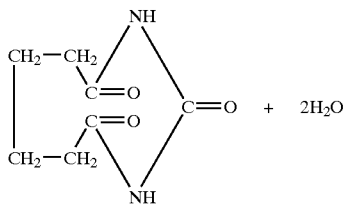

EXAMPLE 2

Semi-amides from Adipic Acid and Urea

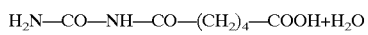

$H_2N$—CO—NH—CO—$(CH_2)_4$—COOH+$H_2O$

EXAMPLE 3

Poly-amides from Adipic Acid and Urea

HO—OC—$(CH_2)_4$—CO—NH—CO—NHOC—$(CH_2)_4$—CO—OH+2$H_2O$

EXAMPLE 4

Hemi-esterification.

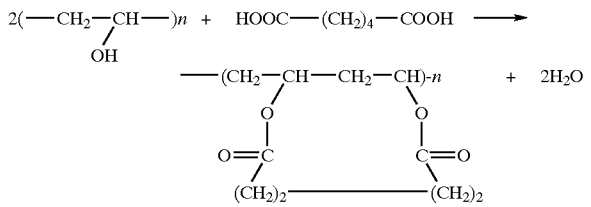

EXAMPLE 5

Full-esterification.

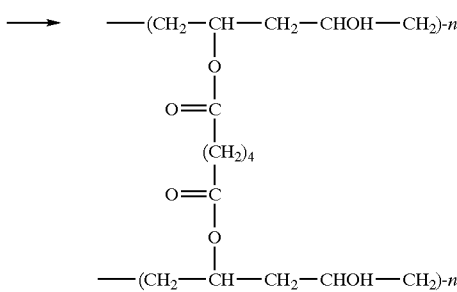

EXAMPLE 6

Secondary High Pressure Reactions-half Ester, Half Urethanized PVA.

Type A-

2-($CH_2$—CHOH)— + HOOC—$(CH_2)_4$—COOH + $H_2N$—CO—$NH_2$ ⟶

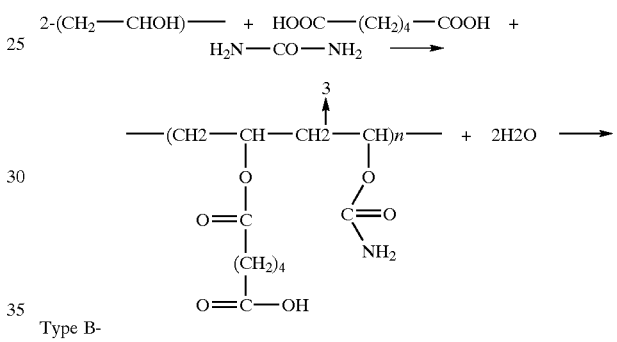

Type B-

Note: The hydroxide located at the "3" position of the PVA molecule may not cleave at this point. Nevertheless, such a structure is consistent with the recovered water produced by this reaction.

And so a chemically homogenous polishing pad substrate, embodying the principle of the invention, is created by a single chemical reaction as disclosed, eliminating the many steps in producing conventional polishing pads. With the invention, polishing pad substrates can be directly molded in situ. The homogeneity of the resulting substrate is due to the premixing of the reaction constituents to produce a homogenous reaction mixture. Because the resulting substrate is homogenous, there are no multiple domains within the substrate to produce layers of unpredictability as to phase composition or separation. In accordance with the invention, the reaction takes place is such a manner that the final formulation or composition of the resulting substrate can be controlled in order to produce a particular type of substrate composition and substrate surface. The described process produces an accurate, reproducible, stochiometrically-predictable substrate, which is not possible with the conventional processes used to manufacture needled felt based polishing pads saturated with urethane derivatives or other polymers. Conventional processes rely on saturation coating applications of fiber like bases, which by their inherited natures, disperse the coating and saturation chemicals in a heterogeneous manner, producing irregular compositions and irregular and unpredictable dispersions of the polymers. Prior art methods of constructing polishing pads cause variations to exist from pad to pad, making their reliability and predictability of quality and performance undependable.

The described process of reaction molding a polishing pad substrate with a reaction mixture of a dibasic acid, urea and PVA has, in addition to those already noted, many important advantages. The reaction molding process of the invention does not rely on a flowable material being forced into a mold or enclosure to bond to a pre-inserted material in the mold after it has been solidified. A polishing pad produced by the process of the invention does not require reinforcement, as described in conventional reaction injection molding and other molding processes, to provide structural integrity of the product. A polishing pad produced by the process of the invention is also very homogeneous, which allows the molding of a polishing pad in a thickness not normally associated with conventional processes and allows the surface of the pad to be repeatedly re-textured or resurfaced with conventional dressing tools. Unlike conventional polishing pad production methods, the invention does not exploit isocyanates, which are environmentally dangerous and toxic. Polyvinyl alcohol, urea and most dibasic acids are not toxic and are considered environmentally benign. The process of the invention also may or may not require a catalyst to drive the reaction process or employ toxic and environmentally harmful polar solvents, and is very efficient as it takes from one to three hours to complete the reaction process and form a substrate. After a substrate that is formed by the process of the invention is removed from the mold, no subsequent curing, machining and dressing are required.

A substrate formed by the process of the invention is easily removed from the reaction mold, and it is not necessary to treat the reaction mold with mold release agents prior to the reaction process. The durometer or hardness of a substrate formed by the process of the invention is controllable by controlling the stochiometric relations of the reactants of the reaction mixture as well as the reaction temperature, reaction time and reaction pressure of the reaction, as monitored by the moles of water produced during the reaction.

Polishing pad substrates are directly molded in situ with the invention. The addition of filler material helps to retain water in the pad, creating a hydrophilic surface. Esters or amides can be produced by the process of the invention, the polyesters being softer than the amides. The use of closed O-ringed molds captures almost all of the water produced in the condensation reaction of the invention. Filler material can also be used to behave as dry-slurries during the planarization process. Substrates without filler material show a close correlation to theoretical and actual results in the condensation data presented above.

The present invention is described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A method comprising steps of:

providing a first quantity of dibasic acid and a second quantity of polyvinyl alcohol;

disposing the first and second quantities in a mold; and applying a pressure and a temperature to the first and second quantities that are sufficient to cause polymerization and substrate formation.

2. The method of claim 1, wherein the dibasic acid comprises adipic acid.

3. The method of claim 1, further including the step of disposing at least one polishing agent in the mold before the step of applying.

4. The method of claim 1, further including the step of disposing at least one filler in the mold before the step of applying for controlling at least one of modulus and coefficient of expansion.

5. The method of claim 1, wherein the step of disposing the first and second quantities in a mold further includes disposing the first and second quantities in a patterned mold.

6. The method of claim 1, wherein the step of disposing the first and second quantities in a mold further includes disposing the first and second quantities in an electropolished mold.

7. A utility pad construction method comprising steps of:

providing a reaction mixture of a first quantity of dibasic acid, a second quantity of urea and a third quantity of at least one hydroxylated polymer;

disposing the reaction mixture in a mold; and applying a pressure and a temperature to the reaction mixture that are sufficient to cause polymerization and substrate formation.

8. The method of claim 7, wherein the dibasic acid comprises adipic acid.

9. The method of claim 7, further including providing the reaction mixture with at least one polishing agent before the step of applying.

10. The method of claim 7, further including providing the reaction mixture with at least one filler before the step of applying for controlling at least one of modulus and coefficient of expansion.

11. The method of claim 7, wherein the step of disposing the reaction mixture in a mold further includes disposing the reaction mixture in a patterned mold.

12. The method of claim 7, wherein the step of disposing the reaction mixture in a mold further includes disposing the reaction mixture in an electropolished mold.

13. The method of claim 7, wherein the hydroxylated polymer comprises polyvinyl alcohol.

14. A utility pad construction method comprising steps of:

disposing layers of reactants in a mold, one of the layers comprising polyvinyl alcohol and the other of the layers comprising a dibasic acid;

applying a pressure and a temperature to the reactants that are sufficient to cause polymerization and substrate formation.

15. The method of claim 14, wherein the dibasic acid comprises adipic acid.

16. The method of claim 14, further including the step of providing the layer of dibasic acid with at least one polishing agent before the step of applying.

17. The method of claim 14, further including the step of providing the layer of dibasic acid with at least one filler before the step of applying for controlling at least one of modulus and coefficient of expansion.

18. The method of claim 14, further including the step of providing the layer of polyvinyl alcohol with a cross-linking agent before the step of applying.

19. The method of claim 14, wherein the step of disposing layers of reactants in a mold further includes disposing the layers in a patterned mold.

20. The method of claim 14, wherein the step of disposing layers of reactants in a mold further includes disposing the layers in an electropolished mold.

\* \* \* \* \*